United States Patent
Morton et al.

(10) Patent No.: US 9,403,299 B1
(45) Date of Patent: Aug. 2, 2016

(54) SYSTEM AND METHOD FOR SPACE-DYEING YARN

(75) Inventors: Bryan Morton, Dalton, GA (US); George Cavanaugh, Dalton, GA (US); Kenneth H. Keith, Chatsworth, GA (US)

(73) Assignee: COLUMBIA INSURANCE COMPANY, Omaha, NE (US)

( * ) Notice: Subject to any disclaimer, the term of this patent is extended or adjusted under 35 U.S.C. 154(b) by 621 days.

(21) Appl. No.: 13/333,396

(22) Filed: Dec. 21, 2011

Related U.S. Application Data

(60) Provisional application No. 61/425,567, filed on Dec. 21, 2010.

(51) Int. Cl.
*B29C 41/22* (2006.01)

(52) U.S. Cl.
CPC ........................................ *B29C 41/22* (2013.01)

(58) Field of Classification Search
USPC ............................................................ 264/78
See application file for complete search history.

(56) References Cited

U.S. PATENT DOCUMENTS

| | | | |
|---|---|---|---|
| 3,541,958 A | 11/1970 | Keown | |
| 3,837,796 A | 9/1974 | Fleissner et al. | |
| 3,922,736 A | 12/1975 | Mand et al. | |
| 3,961,400 A | 6/1976 | Schmid | |
| 4,099,393 A | 7/1978 | Norris et al. | |
| 4,153,961 A | 5/1979 | Cleveland | |
| 4,268,941 A | 5/1981 | Fleissner | |
| 5,626,632 A | 5/1997 | Boyes | |
| 5,669,155 A | 9/1997 | Hughes et al. | |
| 6,165,584 A | 12/2000 | Bryant | |
| 6,312,783 B1 | 11/2001 | Radwan | |
| 6,378,180 B2 | 4/2002 | Maranca et al. | |
| 6,852,134 B2 | 2/2005 | Baumann et al. | |
| 2005/0095425 A1 | 5/2005 | Koh et al. | |
| 2005/0160570 A1 | 7/2005 | Lee et al. | |

FOREIGN PATENT DOCUMENTS

WO 2004038086 A1 5/2004

OTHER PUBLICATIONS

U.S. Appl. No. 14/068,634, filed Oct. 31, 2013, Bryan Morton, 2014/0053347, Feb. 27, 2014, Columbia Ins. Co.

(Continued)

*Primary Examiner* — Larry Thrower
(74) *Attorney, Agent, or Firm* — Ballard Spahr LLP

(57) ABSTRACT

A process for manufacturing spaced dyed yarn for use with tufted or pile carpet including applying one or more colors of dye to one or more yarns in a predetermined spaced relation to form a colorized yarn having a predetermined color pattern.

20 Claims, 4 Drawing Sheets

(56) References Cited

OTHER PUBLICATIONS

U.S. Appl. No. 14/068,660, filed Oct. 31, 2013, Bryan Morton, 2014/0083859, Mar. 27, 2014, Columbia Ins. Co.
Non-Final Office Action mailed Apr. 9, 2015 for U.S. Appl. No. 14/068,634, filed Oct. 31, 2013 (Applicant: Columbia Insurance Company//Inventor: Morton, et al) (6 pages).
Amendment and Response to Non-Final Office Action filed May 20, 2015 for U.S. Appl. No. 14/068,634, filed Oct. 31, 2013 (Applicant: Columbia Insurance Company//Inventor: Morton, et al) (11 pages).
Amendment and Response to Non-Final Office Action filed Dec. 21, 2015 for U.S. Appl. No. 14/068,634, filed Oct. 31, 2013 (Applicant: Columbia Insurance Company//Inventor: Morton, et al) (11 pages).
Requirement for Restriction or Election issued on Dec. 156, 2015 or U.S. Appl. No. 14/068,660, filed Oct. 31, 2013 (Applicant: Columbia Insurance Company//Inventor: Morton, et al) (6 pages).

SYSTEM AND METHOD FOR SPACE-DYEING YARN

FIELD OF THE INVENTION

The field of this invention relates generally to carpet making, and more particularly to a system and method for space-dyeing yarn for carpet manufacturing.

BACKGROUND

The production of yarn having different colors spaced along its length is termed "space dyeing." Space-dyed yarns are desirable because they easily may be formed into textile fabrics that have an inherent random or pseudo-random pattern imparted by the patterning of the yarns comprising the fabric.

Several methods for space dyeing of yarns are known. Among conventional batch-type processes (in which a pre-determined quantity of yarn is treated at one time), it is known to inject yarn packages with a number of different colored dyes to yield a space-dyed product. However, such batch processes are often more costly and require more product handling than continuous processes. Continuous space-dyeing processes (in which moving yarns are individually or collectively treated) are also known. In such continuous space-dyeing processes, it is known to apply dye to yarn via a plurality of rollers arrayed is series or by spraying the yarn onto individual yarns or yarn sheets. While generally more efficient than package dyeing techniques, these continuous space-dyeing processes often experience difficulties with dye mist and drips, which results in unwanted marks and wasted dye liquor. Furthermore, dye overspray from the various colors being applied often mixes together in a single collection system and must be discarded, which results in added costs for replacement dye as well as for waste handling and disposal.

In addition to the problems recounted above, none of these methods has been able to solve the problems of imperfect registration of the dye pattern. That is, the yarns produced by conventional batch-type or continuous space-dyeing methods exhibit undesired un-dyed areas, or areas in which an over-lapping of different dyes results in undesirable colorations. Conventional solutions to the problem of having undesired un-dyed areas have included providing a constant overspray of dye. This particular solution causes more dye to be used than necessary, with the attendant higher production cost per pound of yarn, in addition to the necessity of adjusting dye formulations to compensate for the color(s) imparted by the constant overspray. This "overspray" solution has also tends to exacerbate the problem of undesirable overlapping of adjacent dyed areas and lead to space-dyed yarns in which the overall result is neither predictable nor controllable. What is needed therefore is an in-line process for controlled, efficient and repeatable space-dyeing of yarn during the manufacturing process.

SUMMARY

In response to the deficiencies of the prior art, the present invention is, in one aspect, a process for manufacturing a space-dyed yarn for use with tufted or pile carpet comprising one or more of the steps of extruding a plurality of filaments of polymeric material, combining the filaments to form a plurality of strands, drawing the strands, texturizing the strands into one or more yarn plugs, selectively applying one or more colors of dye to the one or more yarn plugs in a spaced relation, cooling and pulling the plugs, and/or winding the textured and colorized yarn onto a creel.

In one exemplary aspect, the process may also include the step of tacking the strands prior to winding them. For example and not meant to be limiting, an air entangling jet, as commonly known in the art, may be used to tack the plurality of strands.

In another aspect, the present invention is directed to a process for manufacturing a space-dyed yarn for use with tufted or pile carpet comprising one or more of the steps of providing a conventional yarn, feeding at least one strand of the yarn at a predetermined and selectable speed, selectively applying one or more colors of dye to the at least one strand of the yarn in a predetermined, selectable pattern, fixing the applied dye to the at least one strand of yarn, and/or winding the colorized yarn onto a creel.

Other apparatus, methods, and aspects and advantages of the invention will be discussed with reference to the Figures and to the detailed description of the preferred embodiments.

BRIEF DESCRIPTION OF THE DRAWINGS

The accompanying drawings, which are incorporated in and constitute a part of this specification, illustrate several aspects described below and together with the description, serve to explain the principles of the invention. Like numbers represent the same elements throughout the figures.

DETAILED DESCRIPTION OF THE INVENTION

Figure 1:
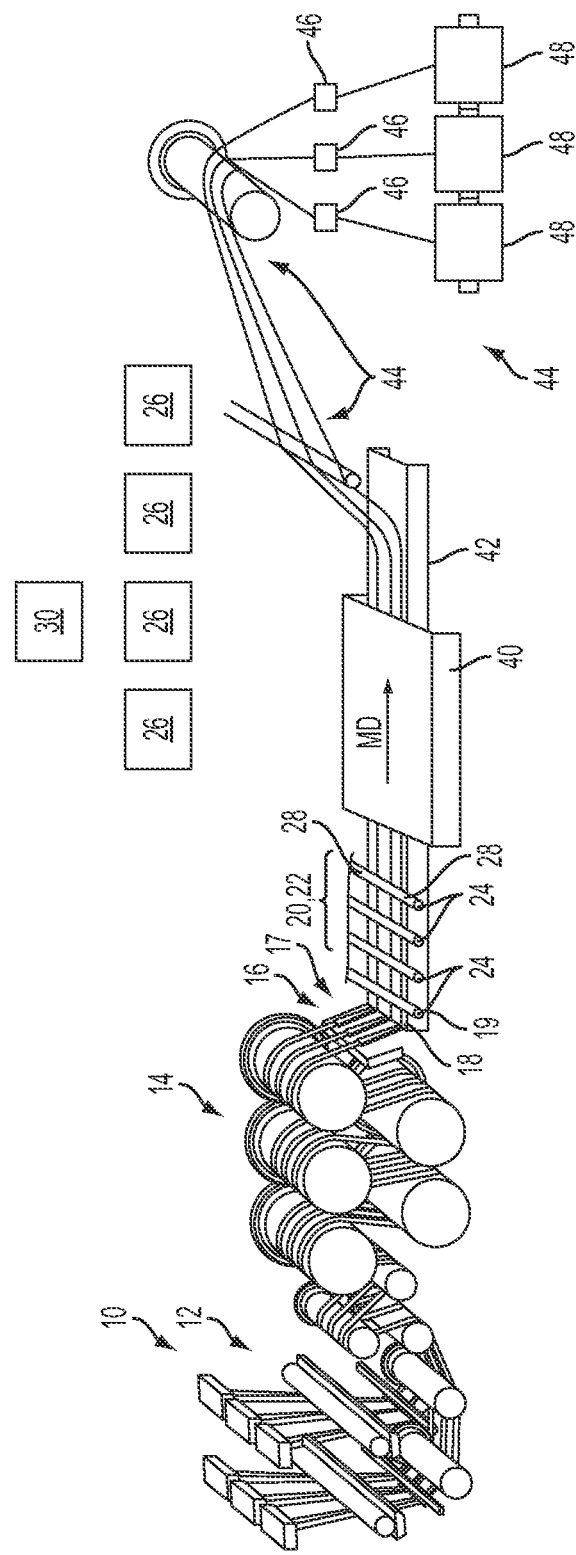
FIG. 1 a schematic view of one embodiment of a system for space-dyeing yarn.

The present invention can be understood more readily by reference to the following detailed description, examples, drawing, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to "a yarn" can include two or more such yarns unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

As used herein, and unless the context clearly indicates otherwise, the term "carpet" is used to generically include broadloom carpet, carpet tiles, and even area rugs. To that end, "broadloom carpet" means a broadloom textile flooring product manufactured for and intended to be used in roll form. "Carpet tile" denotes a modular floor covering, conventionally in 18"×18," 24"×24" or 36"×36" squares, but other sizes and shapes are also within the scope of the present invention.

The present invention may be understood more readily by reference to the following detailed description of preferred embodiments of the invention and the examples included therein and to the Figures and their previous and following description.

As summarized above, in one broad aspect, the present invention provides a space-dyeing system and method for space dying yarn at a select location in the manufacturing process of a finished space-dyed yarn.

In one embodiment and referring to FIG. 1, the present invention relates to a process for manufacturing yarn for use with tufted or pile carpet. In this exemplary embodiment, the process can comprises one or more of the steps of: extruding a plurality of filaments of polymeric material, combining the filaments to form a plurality of strands, drawing the strands, texturizing the strands into one or more yarn plugs, applying one or more colors of dye to the one or more yarn plugs in a spaced relation, cooling and pulling the yarn plugs, and/or winding the textured yarn onto a creel.

In one exemplary aspect, the process can also include the step of tacking the strands prior to winding them. For example, and not meant to be limiting, a conventional air entangling jet may be used in the tacking process.

In this exemplary embodiment, it is contemplated that the sequential steps of extruding a plurality of filaments of polymeric material and the combining the filaments to form a plurality of strands, can be accomplished conventionally in a conventional extruding and combining apparatuses that are exemplarily and schematically shown as steps 10 and 12 in FIG. 1. The extruding and combining apparatuses can be any convenient or desirable extruding and combining device without departing from the spirit of the present invention.

The exemplary extruded polymeric filaments of the yarn strands can be any man-made filaments made from fiber forming thermoplastic materials, including, without limitation, polyesters, polyamides and polyolefins. Suitable polyesters include, but are not limited to, poly(ethylene terephthalate), poly(butylene terephthalate) and copolymers and mixtures thereof. Suitable polyamides include, but are not limited to, nylon 6, nylon 6/6, nylon 6/9, nylon 6/10, nylon 6/12, nylon 11, nylon 12 and copolymers and mixtures thereof. Suitable polyolefins include, but are not limited to, polypropylene, polypropylene derivatives, and copolymers and mixtures thereof.

The ordinarily skilled artisan will recognize that the process conditions, e.g., temperatures, draw ratios, etc., can be varied according to the standard operating procedures for the respective type of fibers being spun. In one aspect, it is contemplated that the fibers of the strands may be multicomponent or monocomponent fibers and have any variety of arrangements of the components, like sheath-core, islands-in-the-sea, side-by-side, etc. It is further contemplated that the individual filaments may be of any geometric cross-sectional shape, e.g., round, multilobal, hexagonal, elongated, hollow, and the like.

As one skilled in the art will appreciate, optional additives may be used forming the composition of the one or more of the filaments. Exemplary additives comprise, without limitation, lubricants, nucleating agents, antioxidants, ultraviolet light stabilizers, antistatic agents, soil resists, stain resists, antimicrobial agents, flame retardants, and the like.

In one aspect, the drawing step 14 can be exemplarily accomplished in a conventional drawing apparatus using any conventional draw ratio suitable for the type of fiber being made. The drawing apparatus can be any convenient or desirable drawing device without departing from the spirit of the present invention. For example, when the yarn is nylon 6 yarn, a draw ratio of about 3 can be utilized. However, the desirable draw ratio will be apparent to those of ordinary skill in the art. In a further aspect, drawing of the yarn can include passing each feed yarn over heated draw rolls that are paired with grooved separator rolls. In this aspect, the separator rolls, when used, can have at least one grooved path for each strand so that the strands remain separate during drawing process. In another exemplary aspect, at least a portion of the grooved paths of the separator rolls are rounded. It will be appreciated that it is contemplated that conventional drawing processes can be used.

Following drawing, one or more of the strands of yarn can be textured in a texturing step 16. The texturing apparatus can be any convenient or desirable texturing device without departing from the spirit of the present invention. In one exemplary aspect, each yarn strand exiting the drawing apparatus is feed into a texturing chamber 17, within which the yarn is allowed to selectively pile up, thereby forming a yarn plug 18. As is typical of known texturing chambers, the movement of yarn into the texturing chamber causes the yarn to collide initially with end wall, and subsequently with itself, thus forming bends and similar shapes, called crimps, in the yarn strand as it resides therein the texturing chamber. Because the yarn has been exposed to heated air, the yarn is softened. As a result, the formed can be substantially permanent set therein the yarn strand as the yarn strand is subsequently cooled. In one aspect, the yarn plug can be subjected to heated airflow, and, at a relatively slow rate, yarn is pressed, or allowed to exit, out of the texturing chamber. In one example and without limitation, the ratio of the speed of the yarn exiting the texturing chamber to the yarn entering the texturing device can be about 1:10.

It is contemplated that conventional texturing processes can be used. In one exemplary aspect, and not meant to be limiting, a conventional texturing jet can be applied to the one or more of the strands of yarn. In this aspect, those of ordinary skill in the art will recognize that the texturing jet should be sized in proportion to the operating denier of the yarn being textured and that the conditions for texturing are dependent to a degree on the yarn being textured. For example, texturing conditions for nylon 6 yarn can comprise: an air temperature of about 215° C.; duo 2 (second draw rolls) temperature of about 115° C. to about 165° C.; and a texturing jet pressure of about 6 to about 10 bar.

The textured yarn exits the respective texturing chambers 17 substantially in the yarn plug form and are then cooled by any known method in a cooling step 19. The cooling apparatus can be any convenient or desirable cooling device without departing from the spirit of the present invention. In one example and without limitation, the cooling process can comprise guiding the textured yarns across respective porous surfaces of rotating cooling drums. It is contemplated that the cooling drums may be any suitable configuration presently known in the art. For example, a vacuum drawn in the interior of the cooling drum can be used to cause ambient air to flow through the yarn plug that is in contact with the porous outer surface of the drum.

According to the present invention, while the yarn strand is still in substantially plug form, each respective plug can be selectively subjected to a spot dyeing process 20. It is contemplated, in various aspects, that the dyeing process can occur substantially simultaneously with at least one of the cooling process, prior to the cooling process, or thereafter the cooling process.

In one aspect, each respective yarn plug can be colored at selected intervals along its length. In another aspect, the yarn plug can be colored substantially along its length. In yet another aspect, the dye can be applied such that it substantially penetrates the plug throughout its entire depth. However, as one skilled in the art will appreciate, it is contemplated that the amount of dye to be applied can be chosen to penetrate the plug to any desired depth.

In one aspect, it is contemplated that the dyeing apparatus 22 can comprise at least one conduit 24 that is positioned to overlie the yarn plugs as the yarn plugs are carried or otherwise urged downstream in the manufacturing direction MD. In this aspect, each conduit is in communication with a pressurized source of dye 26. In another aspect, the at least one conduit can comprise a plurality of conduits. It is contemplated that the plurality of conduits can be positioned in a select array, such as, for example and without limitation, in an array of substantially parallel conduits that are positioned substantially transverse to the manufacturing direction of the yarn manufacturing system. In this aspect, each respective conduit is in communication with a pressurized source of dye. It is contemplated that each respective pressurized source of dye can be a different color or an identical color. One will appreciate that this allows for the contemplated supply of an identical color dye to one or more of the respective conduits, or any select variation of supplied colored dyed to the respective conduits.

In a further aspect, it is contemplated that each conduit 24 can have at least one nozzle or jet 28. It is also contemplated that the at least one nozzle can comprise a plurality of nozzles or jets. In one aspect, it is contemplated that the respective nozzles or jets on a respective conduit can be spaced from each other such that each respective nozzle or jet is positioned to substantially overlie one respective yarn plug that is moving in the machine direction.

Further, the dyeing apparatus 22 can comprise a processor 30 programmed to control the selective delivery of dye to each respective conduit. In a further aspect, it is contemplated that the plurality of nozzles or jets can be individually addressed and controlled by the processor for selective application of the pressurized dye from the individual nozzles or jets 28.

In one aspect, controlled and selective dyeing of the yarn in its substantially plug form allows the moving yarn plug to be dyed in timed intervals, which results in dyed potions that are spaced relative to each other, i.e., space dyeing. In one aspect, it is contemplated that the respective time intervals for each dye application issuing, under control of the processor, from each conduit and/or nozzle or jet can be constant, but optionally, in another aspect, the respective time intervals are substantially random. In addition and as one will appreciate, as the yarn plug passes under the plurality of spaced conduits, the time intervals for each conduit an/or nozzle or jet can be sequentially timed to pattern the yarn plug with at least one color in accord with a predetermined color pattern.

In one aspect, the yarn plug can be dyed and the dye can subsequently be set with a conventional heating process 40, wherein the plug is heated with conventional steam heat or the like. The heating and/or dye setting apparatus can be any convenient or desirable heating and/or dye-setting device(s) without departing from the spirit of the present invention.

Optionally, in another aspect, the yarn plug can be dyed using ink that is sensitive to ultraviolet light. In this aspect, the yarn plug can be exposed to ultraviolet light sufficient to set the dye into the filaments of the yarn. In still another aspect, the dye can be introduced or sprayed thereon the respective yarn plugs using a conventional digital jet-printing technique. It is also contemplated that the application variables such as, for example and without limitation, dye amount, color, dye, dye penetration, and the like, can be selectively controlled by the processor 30 via computer directed signals.

In one aspect, after conventionally cooling and pulling the dye-set yarn plugs in a cooling step 42 and a pulling step 44, the individual colorized yarns can optionally be subjected to a conventional tacking process 46. The respective cooling, pulling and tacking apparatuses can be any convenient or desirable cooling, pulling and tacking devices without departing from the spirit of the present invention. In one non-limiting example, each of the respective yarns exiting the cooling step can be individually and simultaneously tacked using a plurality of air-jet tacking nozzles. After the tacking process, the yarns can be conventionally wound in a winding process 44 onto a creel 48 or other storage rack.

Figure 2:
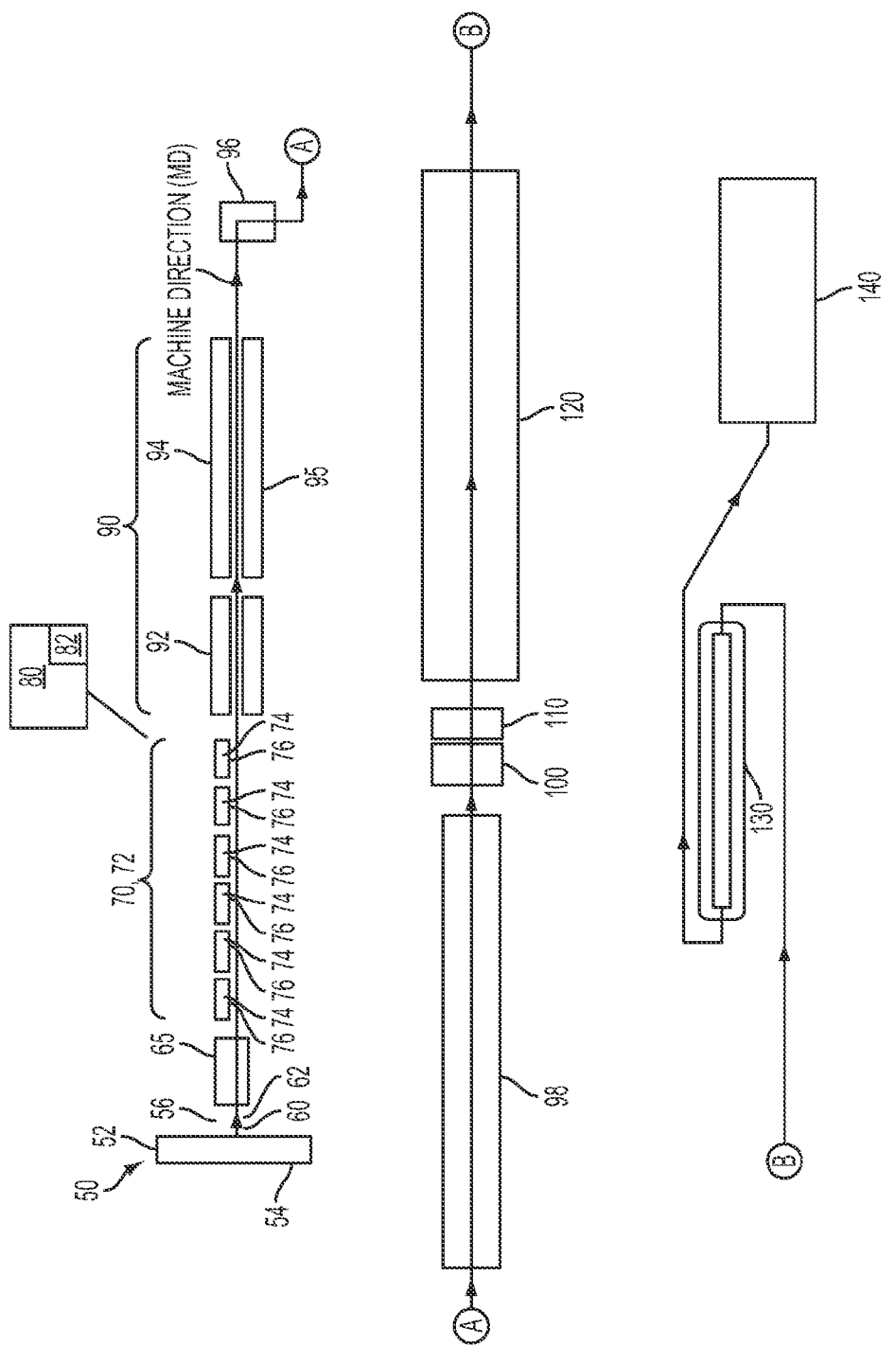
FIG. 2 is a schematic view of a second embodiment of a system for space-dyeing yarn.
Figure 3:
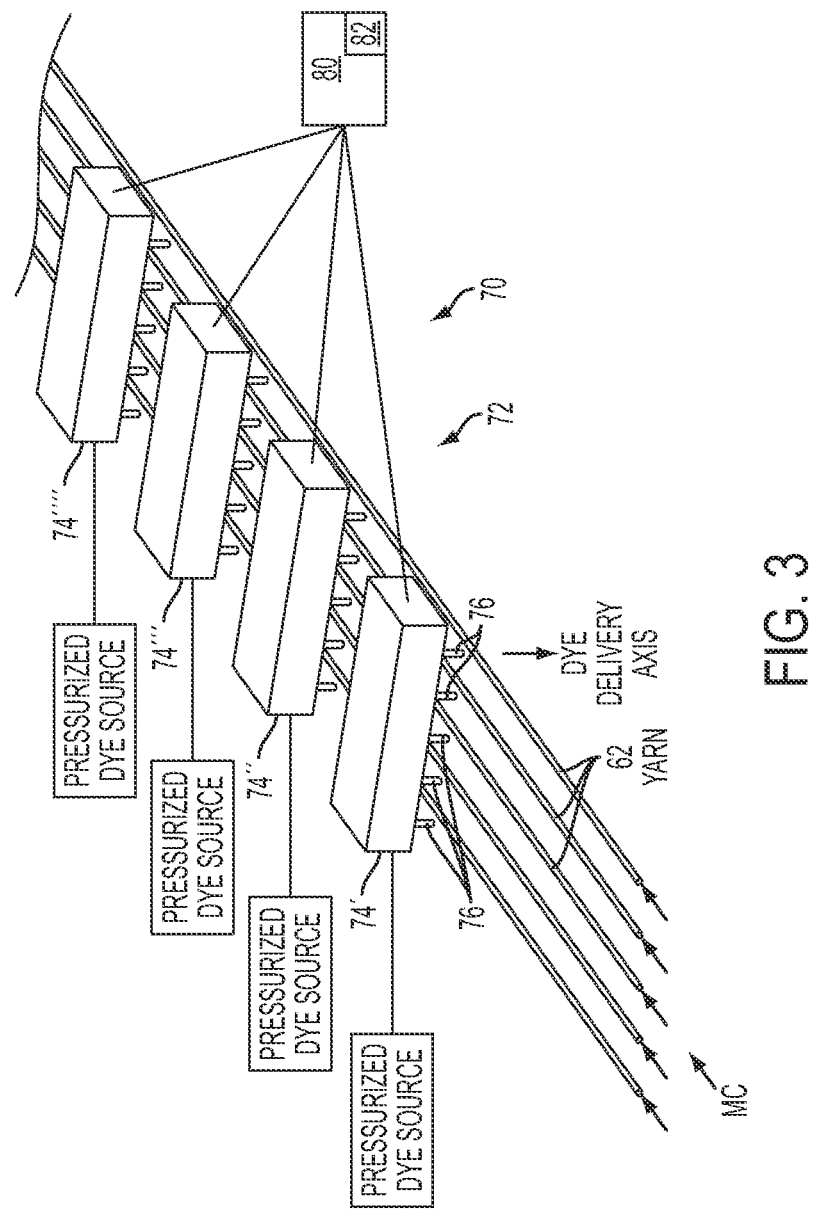
FIG. 3 is an expanded, schematic view of one embodiment of dying station of the system for space-dyeing yarn illustrated in FIG. 2.

In a second embodiment, as shown in FIGS. 2 and 3, a process for manufacturing a space-dyed yarn for use with tufted or pile carpet comprising one or more of the steps of: providing a conventional yarn 50, feeding at least one strand of the yarn at a predetermined and selectable speed 60, selectively applying one or more colors of dye to the at least one strand of the yarn in a predetermined, selectable pattern 70 to form a colorized yarn having a predetermined color patter, fixing the applied dye to the at least one strand of yarn, and/or winding the colorized yarn onto a creel.

The exemplary conventional yarns 52 that can be supplied to the for manufacturing a space-dyed yarn described in this embodiment can comprise any conventional yarn that comprises natural materials, polymeric materials, and/or a combination of natural or polymeric materials. In one exemplary aspect, the polymeric materials of the supplied yarn can comprise any man-made filaments made from fiber forming thermoplastic materials, including, without limitation, polyesters, polyamides and polyolefins. Suitable polyesters include, but are not limited to, poly(ethylene terephthalate), poly(butylene terephthalate) and copolymers and mixtures thereof. Suitable polyamides include, but are not limited to, nylon 6, nylon 6/6, nylon 6/9, nylon 6/10, nylon 6/12, nylon 11, nylon 12 and copolymers and mixtures thereof. Suitable polyolefins include, but are not limited to, polypropylene, polypropylene derivatives, and copolymers and mixtures thereof. In one aspect, it is contemplated that the yarn strand can comprise multicomponent or monocomponent fibers and have any variety of arrangements of the components, like sheath-core, islands-in-the-sea, side-by-side, etc. It is further contemplated that the individual filaments of the respective yarn strands can be of any geometric cross-sectional shape, e.g., round, multilobal, hexagonal, elongated, hollow, and the like.

As one skilled in the art will appreciate, each yarn strand can further comprise at least one or more optional additives. Exemplary additives comprise, without limitation, lubricants, nucleating agents, antioxidants, ultraviolet light stabilizers, antistatic agents, soil resists, stain resists, antimicrobial agents, flame retardants, and the like. In a further aspect, the conventional yarn can be tacked or otherwise textured yarn.

In one aspect, the conventional yarn 52 is supplied or otherwise provided to the dyeing line 50 in a conventional manner that is suitable for the selective unwinding of the yarn and the selective feeding of the yarn to the dyeing line 50. In one aspect, the supplied yarn 52 can be wound therefrom a conventional creel or the like 54. Optionally, each yarn can be feed to a conventional tensioning device 56, which can be configured to place tension on the yarn by pulling the yarn strands while in warp form, that is, in the form wherein the yarn is traveling in a substantially straight or elongated path in an unraveled and uncoiled state.

The intake portion 56 of the dyeing line can be configured to selectively accept one or more individual discrete strands of the supplied yarn substantially simultaneously. In an optional configuration, in which the intake portion 56 of the dyeing line is configured to selectively accept a plurality of individual discrete strands of yarns, each of the respective yarns are passed or directed along separate paths at least through the downstream dyeing process 70. In this aspect, it is contemplated that each of the respective yarns are directed along defined parallel pathways 62 at least through the downstream dyeing process 70. The defined parallel pathways 62 can be positioned substantially adjacent to each other. In one example, the number of defined parallel pathways can be at least 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, or 64 pathways. Optionally, it will be appreciated by one skilled in the art that the number of defined parallel pathways can be selectively limited to not exceed the number of overlying jets of a respective color conduit in the downstream dyeing process 70, as explained in more detail below.

In one exemplary aspect, and at least through the downstream dyeing process 70, the respective yarns passing in a machine direction MC through the defined parallel pathways can be spaced between about 1.000" to 0.050" inches apart between about 1.000" to 0.0625" inches apart, between about 0.999" to 0.0833" inches apart, and optionally between about 0.0833" to 0.0100" inches apart. Optionally, the respective yarns passing in a machine direction MC through the defined parallel pathways can be spaced at least about 0.050" inches apart, at least about 0.075" inches apart, and at least about 0.100" inches apart.

Further, in the feeding step, 60, it is contemplated that at least one strand of the yarn can be fed and drawn through the process line at a predetermined and selectable speed. It is contemplated, in a multi-strand processing line operation, in which multiple yarns are being simultaneously supplied and drawn through the process line, all of the respective yarns will be fed and drawn through the process line at substantially the same predetermined and selectable speed. In one exemplary aspect, and at least through the downstream dyeing process 70, the feeding and drawing speed of the respective yarns passing in a machine direction MC through the defined parallel pathways is between about 1 to 1,500 feet per minute (FPM), between about 300 to 1250 FPM, and, preferably, between about 500 to 1000 FPM. Optionally, the feeding and drawing speed of the respective yarns passing in a machine direction MC can be at least about 300 FPM, at least about 500 FPM, at least about 750, and preferably at least about 1000 FPM.

In one aspect, the supplied yarns, which can be warped form as described above with respect to the tensioning device 56, can be initially directed to pass through a conventional pre-dyeing steamer 65. In this steaming operation, steam at a predetermined temperature is directed thereon the yarn as the yarn passes through the pre-dyeing steamer at the selected feeding and drawing speed of the production line. In one aspect, the predetermined temperature of the supplied steam to the pre-dyeing steamer 65 is between about 50 to 212° F., between about 100 to 211° F., and, preferably, between about 205 to 210° F. In a further aspect, the pre-dyeing steamer 65 is sized to ensure sufficient dwell time therein the pre-dyeing steamer as the yarn passes through the pre-dyeing steamer at the selected speed of the production line to effect a raise in the temperature of the yarn exiting the pre-dyeing steamer to between 50 to 212° F., between about 75 to 200° F., and, preferably, between about 100 to 150° F. In a further aspect, the pre-dyeing steamer 65 is sized to ensure sufficient dwell time therein the pre-dyeing steamer as the yarn passes through the pre-dyeing steamer at the selected speed of the production line to effect a raise in the relative moisture content of the yarn to a desired level of at least about 1%, at least about 2%, and preferably at least about 5%.

The steamed and heated yarn(s) are subsequently passed therethrough a dyeing station 72 in the dyeing process 70. In one exemplary aspect, the dyeing station can comprise a CHROMOSpace Yarn printing device manufactured by Zimmer. In the dyeing process 70, one or more colors of dye can be selectively applied to each of the at least one strand of the yarn passes through the dyeing station 72 at the selected feeding and drawing speed of the production line in a predetermined, selectable pattern. In one aspect, it is contemplated that dye color can be selectively sprayed onto the strands of yarn in accordance with the predetermined pattern. It is contemplated that the dye color can be applied to the strands of yarns within a tight directional tolerance in the longitudinal length dimension of the supplied yarn strand, which is parallel to the machine direction, and in the transverse, width direction of the yard strand. This tight directional spray dyeing tolerance allows for minimizing of dye overspray and loss and for the selective ability to highly discrete predetermined segments of colors on the respective yarn strands. As one skilled in the art will appreciate, the ability to produce colored segments on a respective yarn strand within a tight tolerance allows for the possibility of selectively and repeatedly dyeing a respective strand to minimize or eliminate undesired overlap of adjacent colored segments of the yarn strand, to produce a predetermined amount of overlap of adjacent colored segments of the yarn strand, and the like.

In one aspect, the dyeing station 72 comprises at least one color conduit 74 positioned to overlie the at least one strand of the yarn passing through the dyeing station 72. In one aspect, the at least one color conduit is positioned substantially transverse to the machine direction of the at least one strand of the yarn passing through the dyeing station 72. In an optional aspect, the at least one color conduit can comprise a plurality of color conduits. In this aspect, each color conduit 74 of the plurality of color conduits can be positioned substantially parallel to the adjacent color conduit. In a further aspect, it is contemplated that each respective color conduit 74 can be is operative communication with a source of pressurized dye color [not shown]. Of course, it is contemplated that the respective dye colors that are in communication with the respective color conduits 74 of the plurality of color conduits can be the same color, different colors, or combinations of same and different colors, i.e., one or more of the color conduits 74 can be in communication with one or more sources of pressurized dye color of the same color, and/or one or more color conduits 74 can be in communication with one or more sources of pressurized dye color of different colors.

Each respective color conduit further comprises a plurality of selectively operated jets 76 that are positioned in overlying orientation with the respective passing yarns in the parallel pathways 62. Each respective jet is configured to be selectively opened and closed in response to respective command signal received from a control system 80 to selectively apply dye along a dye delivery axis. In one aspect, the control system 80 comprises a central processor/memory 82 that is programmed to selectively apply dye from each respective jet 76 on each respective color conduit 74 in accord with a selectable design program. Optionally, the processor/memory 82 can be programmed to control dye pumps that effect the pressurization of the dye in the respective sources of pressurized dye color.

In one aspect, it is contemplated that the control system can open and close a respective jet during one respective jet application cycle as desired for the dyed length of yarn desired. It is of course contemplated that the entire yarn strand can be colored, in which case the cycle would initiate upon the initial feed of the yarn and would terminate at the "end" of particular yarn. It is also contemplated that the control system can open and close a respective jet during one respective jet application cycle such that time duration of a single respective application cycle can be less than 60, less than 50 seconds, less than 40 seconds, less than 30 seconds, less than 20 seconds, less than 10 seconds, less than 1 second, less than 0.500 seconds, less than 0.250 seconds, less than 0.100 seconds, and preferably in less than 0.075 seconds.

As one will appreciate, the resultant length of dyed portion of the yarn underlying the respective jet 76 is a function of both the respective minimum duration of an application cycle and the speed at which the at least one strand of the yarn passes through the dyeing station 72. Since both these factors are known, the tolerance of the directional application of the dye to an individual strand of yarn can be very low. In operation, and with the system operating at the nominal speeds described above, it is contemplated that dye can be applied to an individual strand of yarn in one actuation cycle of a respective jet with a start point and stop point of the applied dye being within about 0.500" of the desired start/stop points, within about 0.250" of the desired start/stop points, within about 0.100" of the desired start/stop points, and preferably within about 0.050" of the desired start/stop points. In other various aspects, it is contemplated that each respective jet 76 can selectively apply between about 1-100 g/min of dye, between about 5-75 g/min of dye, between about 7.5-50 g/min of dye, and preferably between about 10-40 g/min of dye at pressurization levels of between about 0.5-5 bar, between about 0.75-4.25 bar, and preferably about 1-3.5 bar.

As one skilled in the art will appreciate, this high level of dye application control can allow for much more precise levels of design applications. For example and without limitation, two different colors can sequentially be applied adjacent each other lengthwise such that the respective adjacent "ends" of the applied color can be spaced from each other a particular and predetermined distance without any color overlap. In one aspect, the particular and predetermined distance can be substantially zero. Optionally and without limitation, two different colors can sequentially be applied adjacent each other lengthwise such the respective adjacent "ends" of the applied color can overlap each other a particular and predetermined distance to generate a colored section that is a function of the different colors, i.e. if the two colors are yellow and green, the colored section would be resultantly be some shade of blue.

Figure 4:
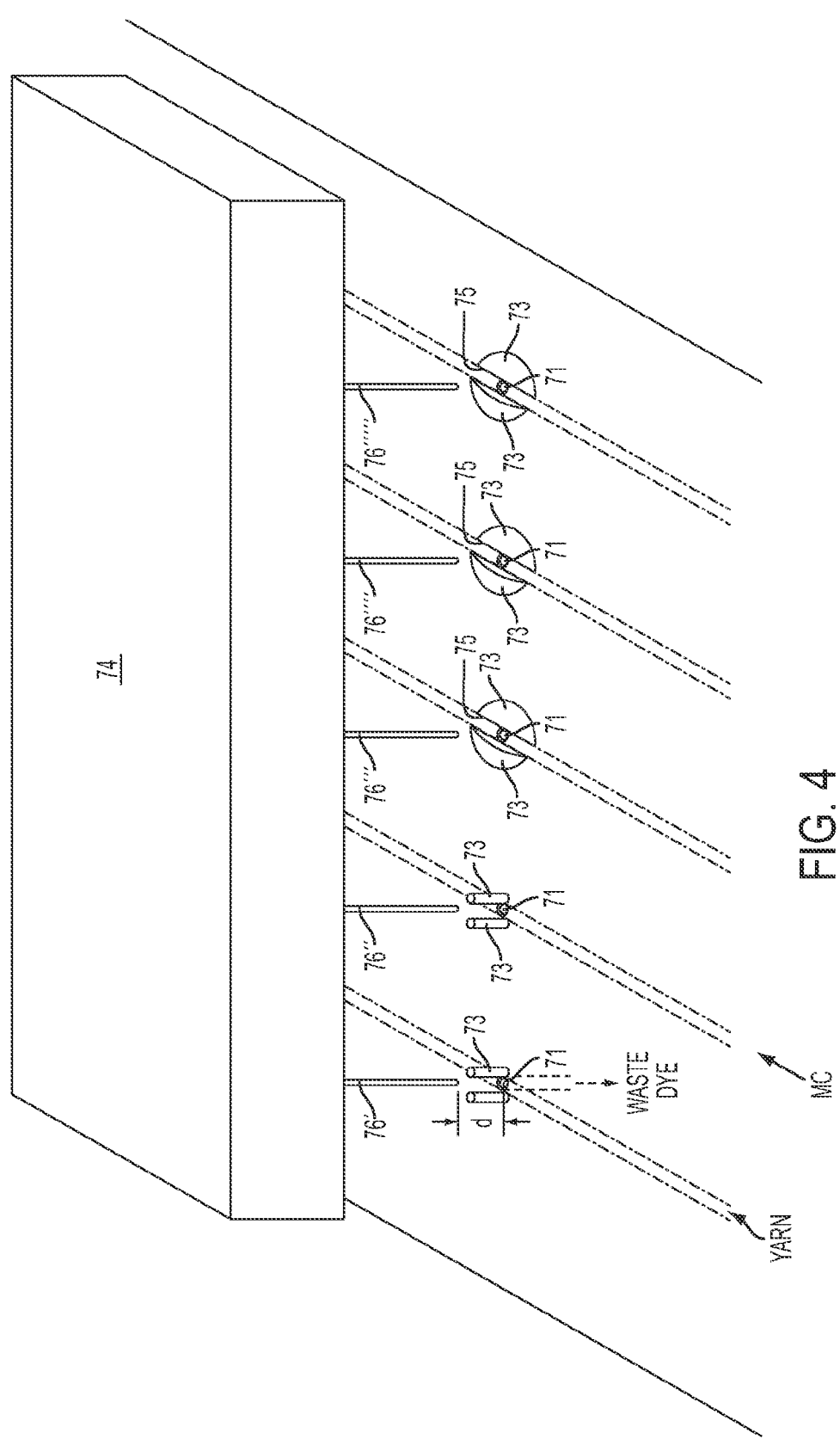
FIG. 4 shows an exemplary schematic view of a portion of a guide positionable under a dye jet of the dying station illustrated in FIG. 3.

In another aspect, and as shown in FIGS. 2-4, as the respective yarn pass under the distal end of the respective jets 76, each yarn can be precisely guided to substantially center the yarn being fed in the machine direction under the dye delivery axis of the respective jet 76. In one exemplary aspect, a guide 71 can be positioned along each parallel pathway substantially under the distal ends of each respective jet 76. The guide 71 can have a pair of opposed vertical obstructions 73 that extend from an upper surface of the guide that are positioned transverse to the machine direction of the yarns passing thereunder the jets 76. In options aspects, the vertical obstructions can comprise, for example and without limitation, a pair of opposed, partially circular elements that define opposing side surfaces that extend on a guide axis substantially parallel to the machine direction through the dyeing station, a pair of opposed posts, and the like. In a further optional aspect, it is contemplated that the guide can further define a bore 75 that extends downward from upper surface of the guide. In operation, the bore 75 of each guide can be disposed thereunder the distal end of a respective jet 76 and is sized and shaped so that any extraneous or overspray dye being applied thereto the yarn can be communicated, via the bore, to a coupled waste pan for selective recovery of the overspray dye.

In another aspect, it is contemplated that the distal end of each dye can be spaced from the yarn passing thereunder between about 0.001" to 6.000" inches apart between about 0.005" to 1.000" inches apart, between about 0.0075" to 0.500" inches apart, and optionally between about 0.010" to 0.2500" inches apart.

After the color has been applied to the yarn in the dyeing process 70, the yarn passes through a post-dyeing steamer 90, which can comprises at least one of a dry heat fix process 92 and/or a wet heat (steam) process 94. In one aspect, the dry heat fix process 92 can comprise a housing containing heat elements that are heated to at least about 212° F., at least about 250° F., and preferably at least about 300° F. In a further aspect, the wet heat (steam) process 94 can comprise a housing 95 in the form of a box having steam flowing from the bottom, through the yarn and up to the top. As one skilled in the art will appreciate, the dyed yarn enters and exits through openings at the front and rear of the post steamer housing that are in communication with ambient atmospheric conditions and thus the exemplified steamer can be an atmospheric steamer. In one aspect, it is contemplated that the maximum temperature of the steam used in the wet heat (steam) process 94 can be between about 200 to 220° F., between about 210 to 213° F., and preferable is about 212° F.

As one will appreciated the yarn is traveling very quickly in warp form, e.g. in the order of the drawing speeds of the yarns described above, and does not spend much time within the post steamer 90. In one aspect, it is contemplated that the post steamer 90 can be sized to ensure that the dyed yarn dwells within the post steamer 90 for a period of time sufficient for the applied dye to be fixed to a degree necessary to substantially prevent smearing of one color onto another when the yarn is subsequently coiled in rope form in a coiler 96. In one aspect, and as one skilled in the art will appreciate, the tension placed on the yarn by the tensioning device results from the tensioning device pulling the yarn from the coiler.

In one aspect, the coiler can be configured to deposit the yarn in rope form onto a conveyor which slows down the movement of the yarn so that when entering a main steamer 98, the yarn may dwell therein for a selective period of time, which can be between about 1 to 15 minutes, between 2 to 10 minutes, and preferably between about 2.5 to 5 minutes. Such a dwell time is generally sufficient for nylon type yarns; other yarns may require additional dwell time within the final steamer to fix the dye. It is contemplated, in one non-limiting example, that the main steamer 98 to the post dyeing steamer 90 used in the wet heat (steam) process 94 in that it comprises a housing that can be in the form of a box or housing having an entrance and an exit for the dyed yarn strands. The main steamer 98 is in operative communication with a source of steam and the maximum temperature of the steam used in the main steamer 98 can be between about 200 to 220° F., between about 205 to 213° F., and preferable is about 212° F.

Completion of the dyeing process optionally includes at least one of: a wash system 100, which sprays water onto the yarn to wash off any excess dye or chemicals that can be on the yarn, a lubricant system 110, which sprays lubricant, such as, for example and without limitation, a 0.5%-1.5% solution of Lurol NF 8949 by Goulston Technologies, Inc., thereon the passing yarn to improve twisting and heat-setting processes downstream of space dyeing, and a dryer 120 for removing the moisture from the yarn. Optionally, after the wash system 100, the yarn can pass through a vacuum system, which can comprise slot over which the yarn passes to remove the excess dye, chemicals and the water on the yarn. In one aspect, the yarn exiting the dryer can be conveyed to an accumulator 130 in coiled rope form on a conveyor to be separated thereafter into a warp configuration and subsequently wound on a winder 140 having separate yarn take-ups for each strand of yarn. In one aspect, and as one skilled in the art will appreciate, the tension placed on the yarn by the tensioning device results from the tensioning device pulling the yarn from the coiler.

One skilled in the art will appreciate that the respective post-dyeing steamer apparatus, the coiler apparatus, the main steamer apparatus, the wash system, the lubricant system, the dryer apparatus, the accumulator device, and the winder device can be any convenient or desirable systems and/or devices for competing the respective process without departing from the spirit of the present invention.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is therefore understood that the invention is not limited to the specific embodiments disclosed herein, and that many modifications and other embodiments of the invention are intended to be included within the scope of the invention. Moreover, although specific terms are employed herein, they are used only in a generic and descriptive sense, and not for the purposes of limiting the described invention.

We claim:

1. A process for manufacturing a space-dyed yarn for use with tufted or pile carpet comprising:
   providing a yarn;
   feeding at least one strand of the yarn at a predetermined and selectable speed along a machine direction to a dyeing station;
   in the dyeing station, selectively applying one or more colors of dye to the at least one strand of the yarn in a predetermined, selectable pattern to form a colorized yarn having a predetermined color pattern, wherein each of the one or more colors of dye is applied to the at least one strand of the yarn at a substantially transverse angle relative to the machine direction and within a directional tolerance in a longitudinal length dimension of the supplied yarn strand, which is parallel to the machine direction, and, in the transverse, width direction of the yarn strand, wherein the directional tolerance for applying dye to the at least one strand of the yarn in one actuation cycle with a start point and a stop point being within about 0.250" of the respective start and stop points; and
   fixing the applied dye to the at least one strand of yarn of the colorized yarn.

2. The process of claim 1, further comprising winding the colorized yarn onto a creel.

3. The process of claim 1, wherein the polymeric yarn is provided in a non-dyed form.

4. The process of claim 1, wherein the yarn is formed from a material selected from a group consisting of natural materials, polymeric materials, and mixture thereof.

5. The process of claim 4, wherein the polymeric materials are selected from the group consisting of polyesters, polyamides and polyolefins.

6. The process of claim 5, wherein the polyesters are selected from the group consisting of poly(ethylene terephthalate), poly(butylene terephthalate) and copolymers and mixtures thereof.

7. The process of claim 5, wherein the polyamides are selected from the group consisting of nylon 6, nylon 6/6, nylon 6/9, nylon 6/10, nylon 6/12, nylon 11, nylon 12 and copolymers and mixtures thereof.

8. The process of claim 5, wherein the polyolefins are selected from the group consisting of polypropylene, polypropylene derivatives, and copolymers and mixtures thereof.

9. The process of claim 4, wherein the each yarn further comprises an additive selected from the group consisting of lubricants, nucleating agents, antioxidants, ultraviolet light stabilizers, antistatic agents, soil resists, stain resists, antimicrobial agents, flame retardants and mixtures thereof.

10. The process of claim 1, wherein the provided polymeric yarn is a textured yarn.

11. The process of claim 1, wherein the step of feeding at least one strand of the yarn at a predetermined and selectable speed comprising feeding a simultaneously feeding, in the machine direction, a plurality of strands of yarn along a plurality of parallel pathways through a downstream dyeing process; wherein each strand of yarn is feed along one pathway of the plurality of parallel pathways.

12. The process of claim 11, further comprising, prior to selectively applying one or more colors of dye to the at least one strand of the yarn, pre-steaming the at least one strand of the yarn being feed at the predetermined and selectable speed to effect a raise in the relative moisture content of the yarn to a desired level.

13. The process of claim 11, wherein the dyeing station comprises at least one color conduit positioned to overlie the at least one strand of the yarn passing through the dyeing station.

14. The process of claim 13, wherein the at least one color conduit is positioned substantially transverse to the machine direction of the at least one strand of the yarn passing through the dyeing station.

15. The process of claim 14, wherein the at least one color conduit comprises a plurality of color conduits in operative communication with a source of pressurized dye color, and wherein each color conduit of the plurality of color conduits is positioned substantially parallel to the adjacent color conduit.

16. The process of claim 15, wherein each respective color conduit further comprises a plurality of selectively operated jets that are positioned in overlying orientation with the respective passing yarns passing along the plurality of parallel pathways, wherein each respective jet is selectively opened and closed in response to respective command signal received from a control system, and wherein each respective jet delivers dye along a dye delivery axis.

17. The process of claim 16, wherein the control system is programmed to selectively apply dye from each respective jet on each respective color conduit in accord with a selectable design program.

18. The process of claim 16, wherein the control system is programmed to selectively apply dye from each respective jet dye to an individual strand of yarn in one actuation cycle of a respective jet with the start point and the stop point of the applied dye being within about 0.100" of the desired start/stop points.

19. The process of claim 16, wherein the control system is programmed to selectively apply dye from each respective jet dye d to an individual strand of yarn in one actuation cycle of a respective jet with the start point and the stop point of the applied dye being within about 0.050" of the desired start/stop points.

20. The process of claim 16, further comprising guiding the yarn being fed through the dyeing station to substantially center each yarn under the dye delivery axis of one respective jet.

* * * * *